United States Patent [19]

Higuchi et al.

[11] Patent Number: 5,129,010
[45] Date of Patent: Jul. 7, 1992

[54] SYSTEM FOR MEASURING SHAPES AND DIMENSIONS OF GAPS AND FLUSHNESSES ON THREE DIMENSIONAL SURFACES OF OBJECTS

[75] Inventors: Kazunori Higuchi; Osamu Ozeki; Shin Yamamoto, all of Aichi, Japan

[73] Assignee: Kabushiki Kaisha Toyoto Chuo Kenkyusho, Aichi, Japan

[21] Appl. No.: 538,525

[22] Filed: Jun. 15, 1990

[30] Foreign Application Priority Data

Dec. 15, 1989 [JP] Japan ................. 1-326267
Dec. 15, 1989 [JP] Japan ................. 1-326268

[51] Int. Cl.⁵ .............................. G06K 9/00
[52] U.S. Cl. ......................... 382/8; 382/67; 358/107
[58] Field of Search ............ 382/8, 65, 67; 358/101, 358/107; 356/381, 384

[56] References Cited

U.S. PATENT DOCUMENTS

| | | | |
|---|---|---|---|
| 4,460,921 | 7/1984 | Henry et al. | 358/107 |
| 4,486,842 | 12/1984 | Herman | 358/101 |
| 4,741,621 | 5/1988 | Taft et al. | 358/107 |
| 4,752,964 | 6/1988 | Okada et al. | 382/65 |
| 4,794,262 | 12/1988 | Sato et al. | 358/107 |
| 4,837,615 | 6/1989 | Boshier | 358/107 |
| 4,837,616 | 6/1989 | Kasono et al. | 358/107 |

Primary Examiner—Leo H. Boudreau
Assistant Examiner—Barry Stellrecht
Attorney, Agent, or Firm—Oblon, Spivak, McClelland, Maier & Neustadt

[57] ABSTRACT

A system for measuring three-dimensional shapes and dimensions includes: an imaging unit which faces an object with shape changes on the surface and images by means of a TV camera the slit line formed on the object surface by projecting slit light from a slit light source at a fixed angle; and a surface feature extraction member for extracting features representing the shape changes of the object surface, based on the changes of the XYZ coordinate values of the object surface detected by triangulation based on the centroid position of the intensity distribution of the slit line image corresponding to the scanning lines from the TV camera. Based on features thus extracted, the surface shape of the object can be measured rapidly with high precision.

11 Claims, 14 Drawing Sheets

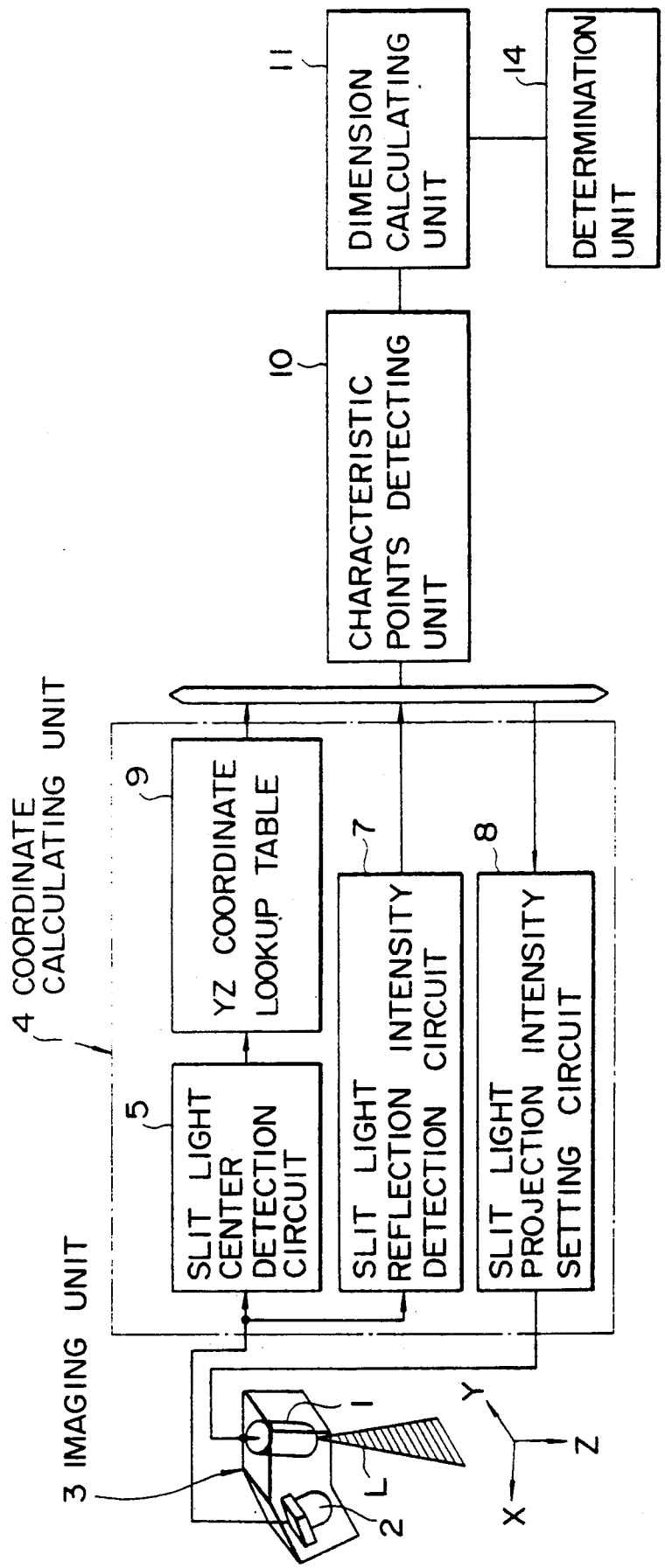

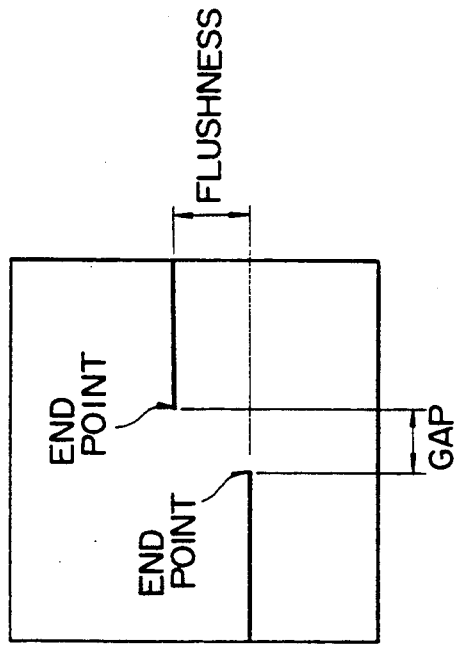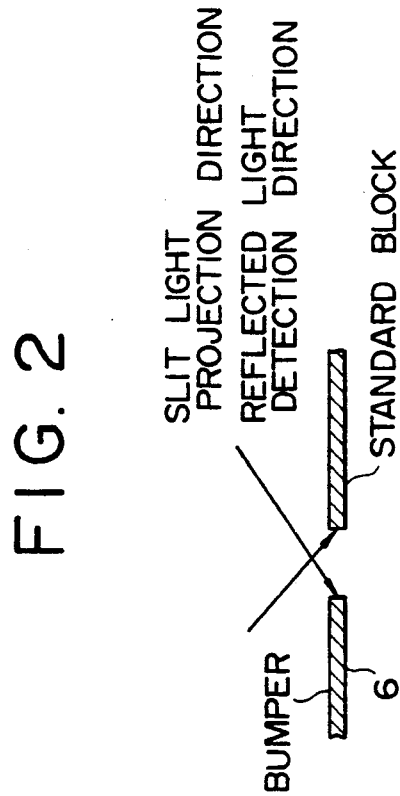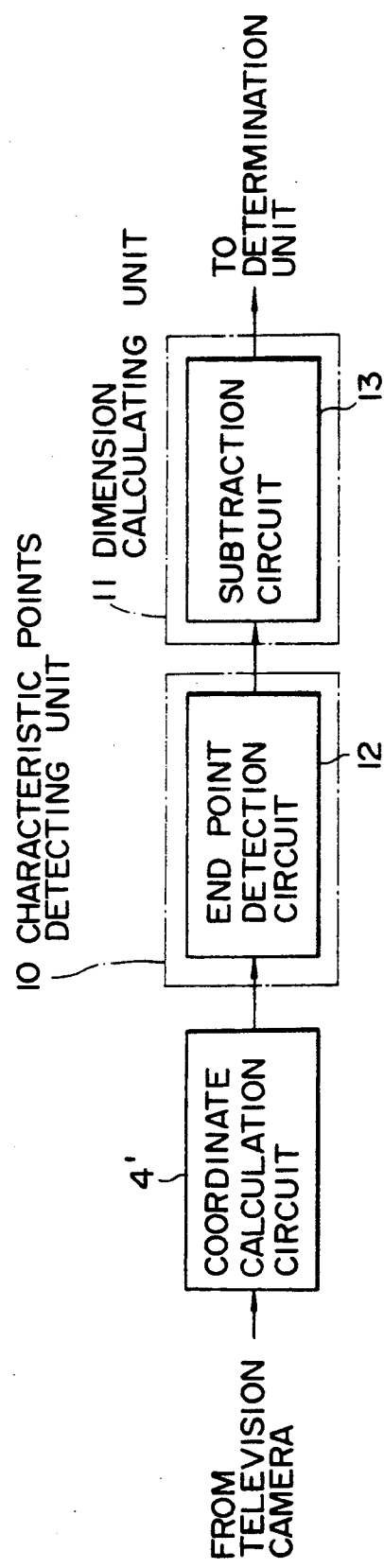

FIG. 15
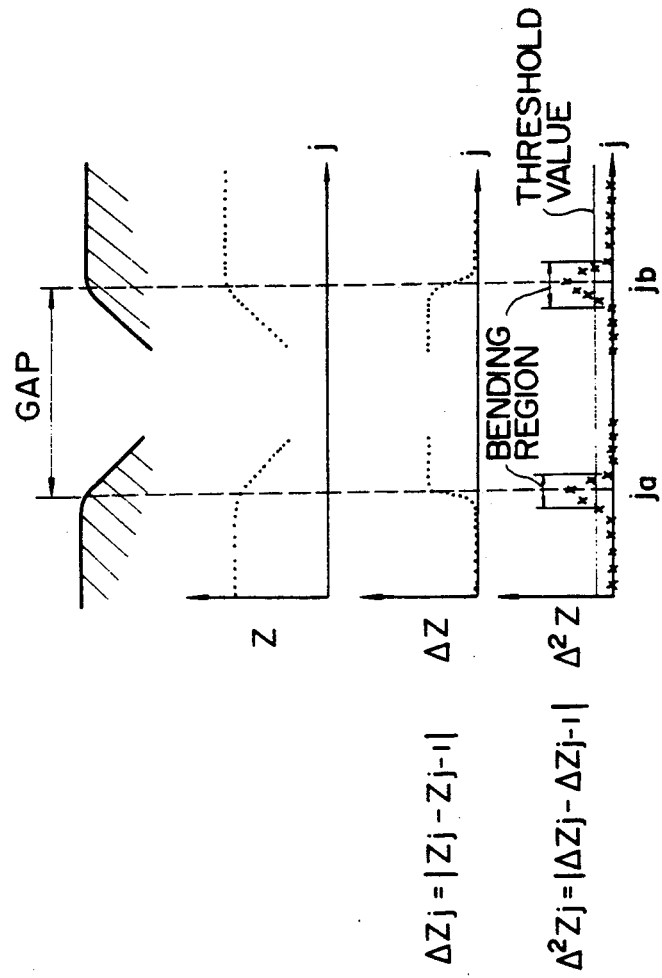
$\Delta Z_j = |Z_j - Z_{j-1}|$
$\Delta^2 Z_j = |\Delta Z_j - \Delta Z_{j-1}|$
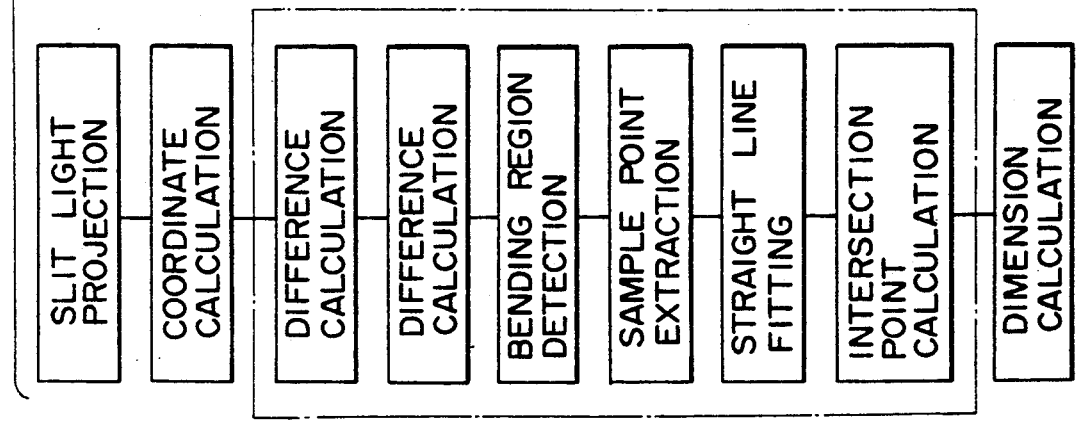

SYSTEM FOR MEASURING SHAPES AND DIMENSIONS OF GAPS AND FLUSHNESSES ON THREE DIMENSIONAL SURFACES OF OBJECTS

BACKGROUND OF THE INVENTION

1. Field of the Invention

The present invention relates to a system for the measurement of three-dimensional shapes and dimensions for maasuring three-dimensional shapes and dimensions in a specific region of an object, for example, for measuring curved shapes or at least one of gap and flushness by means of computing the function (the fitting curve) of an object surface shape or the relative positions of extracted characteristic points.

2. Description of Related Art

As a conventional device for determining the flushness of an object, there is a car sliding roof flushness determination device (Japanese Unexamined Patent Publication 63-61107). It comprises: a laser slit light means for irradiating an infrared laser slit light onto an area extending over the roof part and sliding roof part of a car body; a vision sensor for imaging portions to which the abovementioned laser slit light has been irradiated; and an image processing means wherein the image of the irradiated portion is introduced from the vision sensor and binarized, and, based on the detected amount of divergence of the beam corresponding to the laser slit light in this binarized image, the flushness between the roof part and the sliding roof part is determined.

However, the conventional system had the problem, which had to be solved, that the precision of detection was not sufficient due to the measurement of the flushness by determining the amount of divergence of the beam corresponding to the laser slit light in the binarized image.

Further, hitherto in the production process, dimensional measurements of the flushness and gap of car bodies are performed manually using slide calipers or gap gages. Nevertheless, the former involve discrepancies due to the operator, and even with the same operator there are discrepancies due to the conditions, and the method lacks reliability and there are practical problems which have to be solved. Moreover, in order to perform measurement of the gap or flushness in a specific region of an object and to perform curve fitting to the shape of the object, the XYZ coordinates on the surface of the object are necessary. With measurement of XYZ coordinates in the conventional contact system or spot light system, many points have to be measured in order to measure the precise gap and flushness of an object or to fit curves to the surface shape, and this had the disadvantage that it took time. Further, even in the method using plane object image processing using a slit light, because only the position of the slit light on the image surface (i, j) is obtained, and the XYZ coordinates of the object are not obtained, measurement of the gap and flushness of the object and curve fitting to the surface shape cannot be performed.

SUMMARY OF THE INVENTION

The present invention uses a three-dimensional vision sensor as a coordinate calculating unit which can determine the XYZ coordinates of the object surface rapidly and with high precision by means of a slit light, and measures XYZ coordinates at high speed and with high accuracy and measures numerous points at once, and using the XYZ coordinates, measurement of the gap and flushness of the object, and curve fitting to the surface shape can be performed rapidly and with high precision.

The object of the present invention is to solve the abovementioned problems, and to provide a system for measuring three-dimensional shapes and dimensions with simple, rapid, high precision measurement of at least one of the gap or flushness (or, height and width) of an object or the shape of an object, for example, which can be used for the measurement of the constructional dimensions of a car body, or gap or flushness between car parts and standard blocks or checking fixtures (ones giving reference coordinates), and which can measure the curves constituting a panel or mold simply and rapidly, with high reliability.

DESCRIPTION OF THE FIRST ASPECT OF THE INVENTION

The system for measuring three-dimensional shapes and dimensions according to the first aspect of the invention comprises an imaging unit facing an object with shape changes on the surface, and forming an image by means of a TV camera of the slit line formed on the surface of the aforementioned object by slit light projected by means of a slit light source onto the object surface at a fixed angle, and a surface feature extraction means which, based on the change in the XYZ coordinate values of the object surface determined by triangulation based on the centroid position of the intensity distribution of the slit line image corresponding to the scanning lines from the above-mentioned TV camera, extracts feature showing shape changes of the above-mentioned object surface.

The system of the first aspect for measuring three-dimensional shapes and dimensions can measure the surface shape of the object based on the extracted feature.

The "feature" here is approximation functions showing shape changes of the object surface, or gap, flushness, radius, width, height and the like dimensions of the object.

The system of the first aspect for measuring three-dimensional shapes and dimensions, constituted as mentioned above, uses a television camera to image the slit lines generated by the slit light from the slit light source which reflects at least one of the surface shape, flushness and gap in the specified region of the object, by means of an imaging unit. Furthermore, in the surface feature extraction means, an approximation function corresponding to the specific surface shape portion in a specific region, or the relative dimensions of the gap and flushness in a specific region are determined from the determined XYZ coordinates of the object surface based on triangulation from the centroid position of the intensity distribution of each scanning line of the slit line image obtained by means of the imaging unit. Namely, the feature of the object to be measured by means of the system of the first aspect are, for example, the gap and flushness which are relative distances between a door and a fender of a car body, or the surface curvature of a car panel. Here flushness and gap are calculated from the differences or distances of the XYZ coordinates of characteristic points which define the gap and flushness on the obtained slit light image when the slit light from a slit light source is projected as a three-dimensional vision sensor onto the object, and curvature is calculated by approximation functions in the specific region on the slit light image.

In this manner, in the first aspect, by using a three-dimensional vision sensor, the XYZ coordinates corresponding to the slit light image on the object surface are obtained as many points by one projection of the slit light, so the determination of these characteristic points and the calculation of the approximation functions can be performed precisely and with good efficiency.

Furthermore, the dimension at the time of measurement is not an image element number on the image surface but the XYZ coordinates, so the dimension of the determined characteristic points and the approximation function becomes the same as the XYZ coordinates. Accordingly, without calculating the dimension, the absolute values of the dimensions and the surface shape of the object are obtained rapidly and precisely, thus giving great practical effects.

DESCRIPTION OF THE SECOND ASPECT OF THE INVENTION

The system for measuring three-dimensional shapes and dimensions according to the second aspect of the invention comprises: an imaging unit facing an object possessing at least two end parts forming at least one of the gap and the flushness, wherein a slit light is projected by a slit light source onto the object surface at a fixed angle and the slit line formed by the slit light is imaged by a TV camera; a characteristic points detecting unit to determine the XYZ coordinates by extracting at least one pair of characteristic points consisting of two characteristic points from the relationship of the standard values and the difference of the XYZ coordinates obtained according to the scanning lines of the object surface determined by triangulation based on the centroid position of the intensity distribution for each scanning line in the image of the slit line from the abovementioned TV camera; and a dimension calculating unit which calculates the relative position relationship between the two characteristic points based on the difference of each of the XYZ coordinate values of the two characteristic points constituting the pair of characteristic points detected by the abovementioned characteristic points detecting unit.

In the system constituted as mentioned above by the second aspect for measuring three-dimensional shapes and dimensions, the slit line formed by the slit light from the slit light source reflecting at least one of the gap and the flushness in a specific region of the object, is imaged by the television camera in the imaging unit. Then, based on triangulation from the centroid position of the intensity distribution according to the scanning line of the slit line image obtained by means of the characteristic points detecting unit, the XYZ coordinates of the characteristic points are detected to define the relative dimensions related to the gap and flushness in the specific region, from the detected XYZ coordinates of the object surface. Next, the relative position relationships between the two characteristic points are calculated by the dimension calculating unit based on the difference in XYZ coordinates of the characteristic points detected by the aforementioned characteristic points detecting unit. Namely, the object dimension measured by the system of the second aspect is, for example, the flushness or gap which is the relative distance between the door and fender of a car body. Here the flushness or gap is calculated from the distance or difference of the XYZ coordinates of the end points of the slit light image obtained by projection onto the object of the slit light from the slit light source as the three-dimensional vision sensor.

In addition, according to the second aspect of the invention, in the case where the object has an end of rounded shape, the compensated value prepared beforehand is added at the end point of the slit light image in the characteristic points detecting unit, thereby detecting a characteristic point which is in good agreement with the true end of the object. As a result, in comparison with the case when this compensated value is not used, the advantage is that the gap dimension can be correctly measured.

Furthermore, in the second aspect, because there is used a three-dimensional vision sensor which can rapidly and precisely measure the XYZ coordinates of the object surface along the slit line at many points at once, rapid and precise measurement of the dimensions of the flushness or gap of the object can be achieved. Conventionally, in a contact type or spot light type three dimensional coordinate measurement machine, the XYZ coordinates of the end points which define the dimensions of the object, could not be determined unless the sensor or object was caused to move several times and measured carefully taking much time. However, with dimension measurements using this three dimensional vision sensor, just by arranging the object at a position within the measurement range of this three dimensional vision sensor, the XYZ coordinates of the end points are obtained, thus enabling rapid and precise shape dimension measurements.

In this manner the system for the three dimensional measurement of shapes and dimensions according to the second aspect of the invention, gives a great practical effect in that the flushness and gap in the object can be measured rapidly and with high precision in a non-contact manner.

Another example of the second aspect of the invention may have a determination unit to determine the quality of the dimension values calculated by the dimension calculating unit, in addition to the above-mentioned structure.

In the determination unit, the quality standards set beforehand are compared with the measured dimensions, and the quality is decided according to whether they fall within the standard or not, and the result is outputted. From the result outputted from the determination unit, it can easily be judged whether or not the flushness or gap of the car body is within standard.

DESCRIPTION OF THE THIRD ASPECT OF THE INVENTION

The system for measuring three-dimensional shapes and dimensions according to the third aspect of the invention comprises an imaging unit facing the object with shape changes at least along the Z-axis (in height), and imaging by means of a TV camera the slit line formed on the surface of the object by slit light projected by a slit light source at a fixed angle towards the surface of the object, and a surface shape fitting unit fitting a function corresponding to the change of surface shape values of the aforementioned object for the aforementioned shape change in the specific region by means of XYZ coordinates corresponding to the object surface detected by means of triangulation based on the centroid position of the intensity distribution corresponding to each scanning line of the slit line image from the TV camera, which is constituted by measuring the surface shape in a specific region of the object by means of representing by the fitted functions.

The system for measuring three-dimensional shapes and dimensions according to the third aspect of the invention determines the XYZ coordinates of the object surface in the coordinate calculating unit based on the slit light image obtained by projecting the slit light on the object surface with shape changes at least along the Z-axis (in height) and imaging the slit line by the television camera, and measures the object surface shape by fitting functions corresponding to the shape the object surface in the surface shape fitting unit, from obtained XYZ coordinates.

Specifically, the coordinate calculating unit 4 determines with good precision, by finding the centroid of the reflected signal intensity, the central position of the slit light, for each scanning line, in the slit line image obtained by projecting onto the object and imaging with the television camera, and determines the XYZ coordinates (Y, Z) by the principle of triangulation from the obtained central position of the slit light and the positions of the television camera 2 and slit light source 1. Moreover, in this aspect of the invention, the slit direction of the projected slit light and the scanning direction of the TV camera are arranged at right angles spatially.

Here, for example, when the television camera 2 having 500 scanning lines images over a range of 30 mm in the Y direction, the pitch of the Y direction data becomes about 0.06 mm, and 500 points of the XYZ coordinates of Y, Z are obtained in one slit line at the same time.

Next, in the surface shape fitting unit, a region performing curve fitting is extracted from the XYZ coordinates obtained by means of the coordinate calculating unit, and the shape of the object surface is measured by polynomial fitting by the method of least squares from the XYZ coordinates of sample points within this region. For example, when the curved shape of a car body panel is measured, in the XYZ coordinate values of the object surface obtained by means of the coordinate calculating unit projecting slit light, the difference of the Z coordinate corresponding to the adjacent scanning lines and the differences of the differences are calculated, so that the change points of the curvature are determined, and the curve fitting performance region is extracted from these points. Furthermore, circular fitting performed by means of the method of least squares from the XYZ coordinate values of a suitable number of sample points within this region, and the shape of a specific region of the panel is measured.

In order to measure the curved shape of this object surface rapidly and with high precision, it is necessary for the XYZ coordinates of the object surface to be measured rapidly and with high precision, and also at many points, when the curve fitting performance region is extracted and curve fitting is performed.

Accordingly, in the third aspect, because a three-dimensional vision sensor is used which can measure many points at once, rapidly and with high precision, of the XYZ coordinates of the object surface along the slit line, the measurements of the flushness and gap dimensions of the object and the curved surface shape can be achieved rapidly and with high precision. In the conventional contact type or spot light type XYZ coordinate measurement machines, measurements had to be made in detail by moving the sensor or the object several times in order to find with good precision the curved shape and the XYZ coordinates of the end points defining the dimension of the object; because of this, much time had to be taken. Further, in a method using planar image processing in which a slit light is used, no XYZ coordinates can be obtained at the position (i, j) of the slit light on the image surface and the curved shape of the object cannot be found. However, by the method of measuring shapes and dimensions in which this three-dimensional vision sensor is used, just by arranging the object at a position within the measurement range of this three-dimensional vision sensor, the XYZ coordinates of the object surface are obtained, thereby enabling measurement of the shape and dimensions rapidly and with high precision.

DESCRIPTION OF THE FOURTH ASPECT OF THE INVENTION

The system for measuring three-dimensional shapes and dimensions according to the fourth aspect of the invention comprises: an imaging unit facing an object with shape changes at least along the Z-axis (in height) and imaging by means of a TV camera the slit line formed on the surface of the object by means of a slit light projected from a slit light source at a fixed angle towards the object surface; a starting point determination unit to determine the starting point at the beginning of the shape change based on the ratio of change along the Z-axis (in height) of the XYZ coordinates corresponding to the adjacent scanning line of the object surface determined by triangulation based on the centroid position of the intensity distribution for each scanning line of the silt line image from the TV camera; a surface shape fitting unit fitting a function corresponding to the change of the XYZ coordinate values of the aforementioned object surface to the shape change in the region specified by the aforementioned starting point; a characteristic points extracting unit extracting as at least one characteristic point the shape change portion which the object possesses in the specific region based on the fitting function; and a dimension calculating unit calculating the gap and flushness which the object possesses, by calculating the relative position relationship between the extracted characteristic points.

The fourth aspect of the invention differs from the aforementioned third aspect in that it determines gap and flushness of the object with shape changes at least along the Z-axis (in height). Namely, in the coordinate calculating unit, the XYZ coordinates of the object surface are determined, and from the obtained XYZ coordinate values, in the starting point determination unit, the starting point is determined of the beginning of shape change based on the change ratio along the Z-axis (in height) of the XYZ coordinate values corresponding to each scanning line, obtained from the coordinate calculating unit. Furthermore, in the surface shape fitting unit, a function is fitted corresponding to the change of the XYZ coordinate values of the object surface, to the shape change in the region specified by the aforementioned starting point.

Furthermore, in the characteristic points extracting unit, based on the fitting function, the shape change portion of object in the aforementioned specific region is extracted as at least one characteristic point. Furthermore, in the dimension calculating unit, the gap and flushness possessed by the object are calculated by calculating the relative position relationship of the characteristic points determined as mentioned above.

In this manner, in order to determine rapidly and with high precision the gap and flushness of an object with shape changes along the Z-axis (in height), it is necessary to measure rapidly and with high precision, at many points, the XYZ coordinates of the object surface, in the shape change starting point determination unit and the surface shape fitting unit.

Further, at an end portion with changing shape, in comparison with a sharp edge portion, it is difficult to determine the point defining the dimension, and it is difficult to measure a high precision dimension solely by determining a single end point because reflection signals are hard to obtain, etc. In the fourth aspect of the invention, because a three-dimensional vision sensor is used which can measure the XYZ coordinates of many points rapidly and with high precision, and because curves are fitted to end parts whose shape changes, the dimension can be measured rapidly and with high precision, even in the end parts whose shape changes, achieving great operating efficiency in practical use.

Other examples of the third aspect and the fourth aspect, in addition to the aforementioned constitution, may be provided with determination units for judging the quality of the dimension values calculated by the dimension calculating unit circuit. Furthermore, the aforementioned imaging unit may be constituted in a manner that the arrangement is such as to project slit light from respective oblique directions (nearer directions to directions normal to corner parts) and to detect reflected light from oblique directions, so that observation is possible of the slit line images of opposed corner portions of the objects forming the gap and flushness.

The aforementioned determination unit compares the measured dimension with a previously set quality standard, determines whether it falls within the standard, and outputs the result. From the quality result outputted by the determination unit, whether the gap and flushness of the car body, and the curved shape of the car body are within the standard, is easily decided. When the arrangement is such that the slit light is projected from an oblique direction and the reflected light is detected from an oblique direction, the precision of detection of the characteristic points on the slit line of the corner portions is increased in comparison with the arrangement which is not of this kind. In measurement of the gap and flushness, a measurement value up to the physical end is obtained and thus the end point comes to be in good agreement with the physical end. Further, in measurement of a curved shape, the XYZ coordinates close to the characteristic points are obtained at many points and thus the number of sample points of the curve fitting calculation is increased, thereby increasing the fitting precision.

BRIEF DESCRIPTION OF THE DRAWINGS

FIGS. 1-6 show the system for measuring three-dimensional shapes and dimensions according to a first embodiment of the present invention;

FIG. 1 is a block diagram of the system of the first embodiment;

FIG. 2 is a diagram of the main part of the measurement object;

FIG. 3 is a block diagram showing specific parts in the system of the first embodiment;

FIG. 4 is a line diagram of a slit line image in the system of the first embodiment;

FIG. 5 is a diagram explaining the video signals output from the TV camera;

FIG. 6 is a flow chart showing the measurement procedure in the system of the first embodiment;

FIGS. 13-15 are respectively a block diagram, a line diagram and a flow chart showing the system of the fourth embodiment;

EMBODIMENTS

Figure 5:
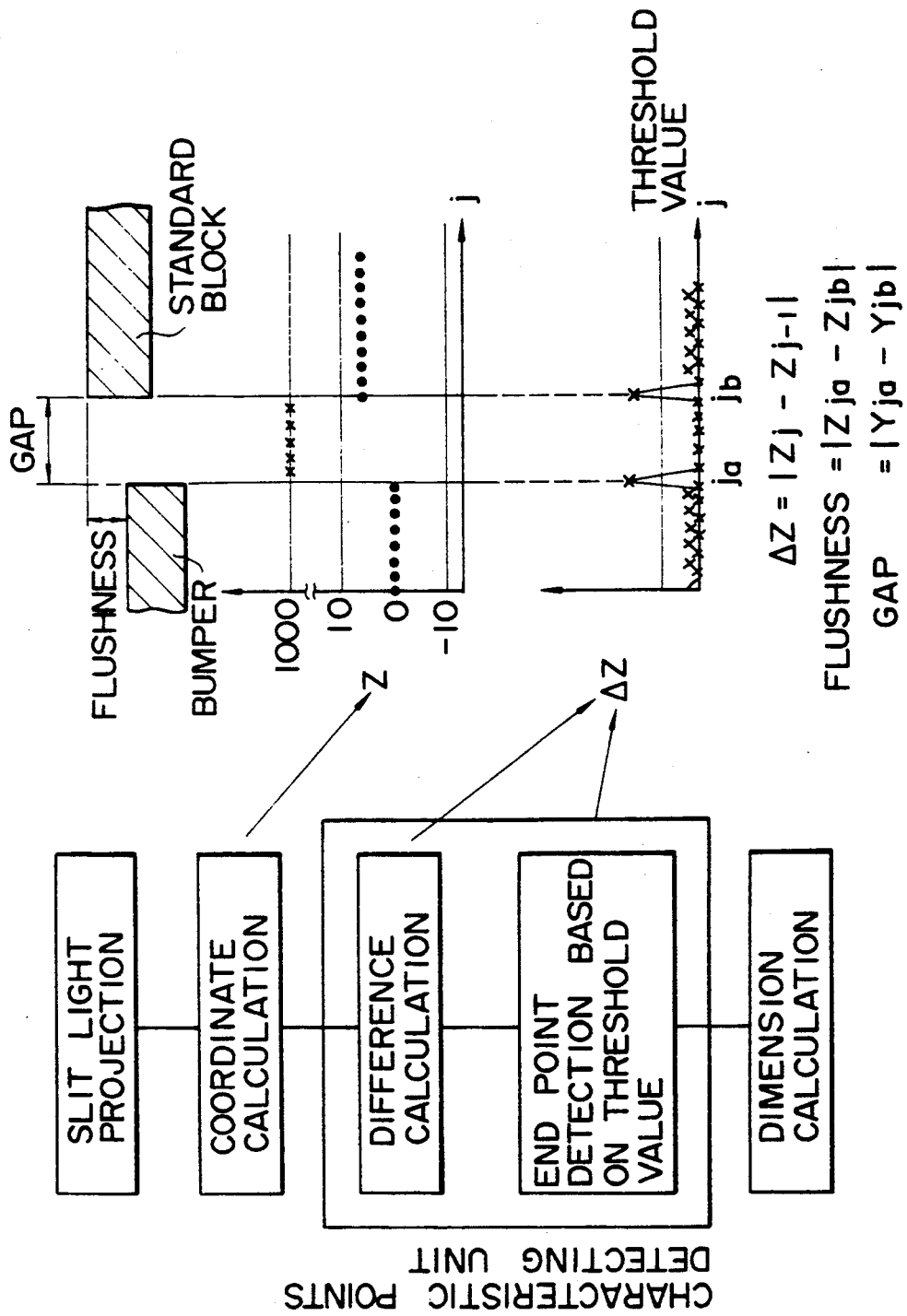
Figure 6:
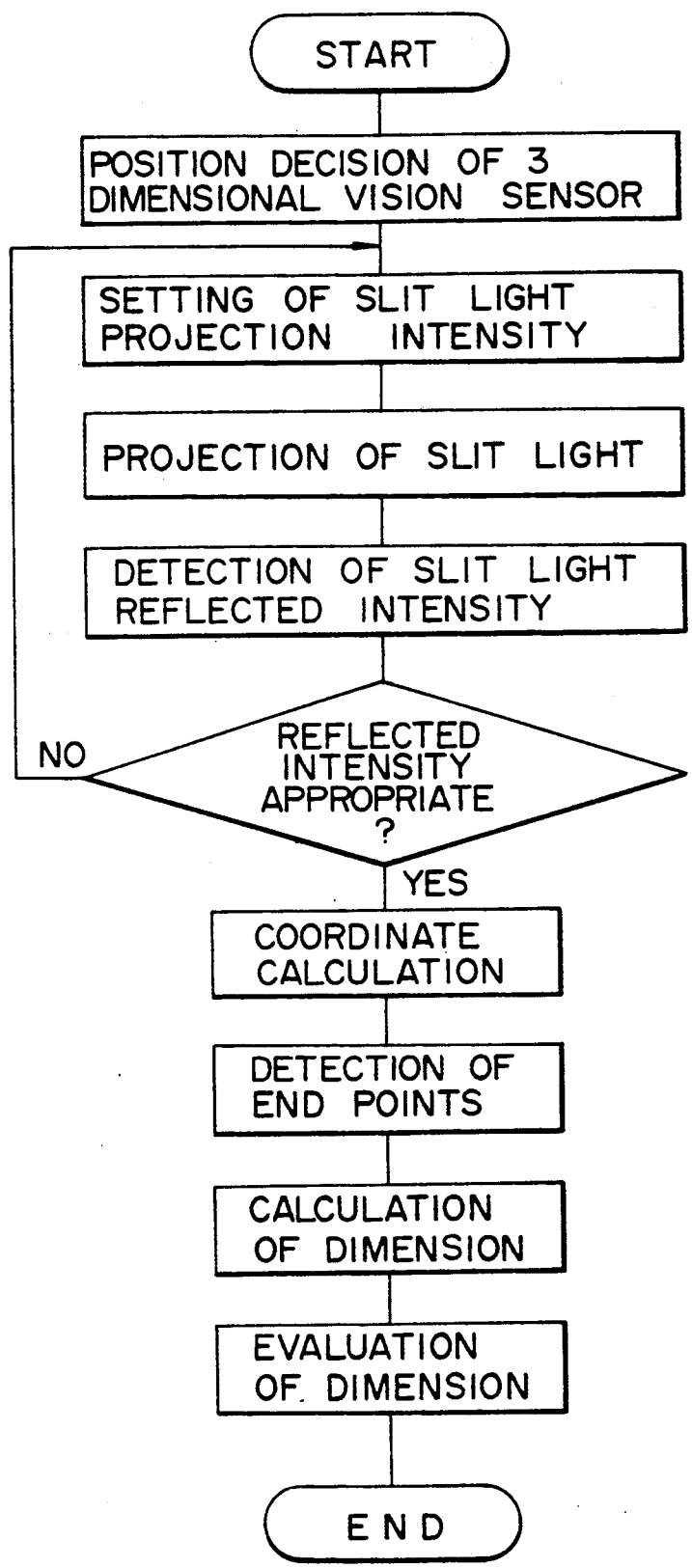

The system for measuring three-dimensional shapes and dimensions of the present invention is explained below by way of embodiments.

EMBODIMENT 1

According to the first embodiment of the present invention, the system for measuring three-dimensional shapes and dimensions is applied to a car bumper assembly dimension measurement system as shown in FIGS. 1-6. In this system, a three-dimensional vision sensor comprises an imaging unit 3 including a slit light source 1 and a television camera 2, and a coordinate calculating unit 4. The coordinate calculating unit 4 is constituted by a slit light center detection circuit 5 which performs calculation of the centroid in order to obtain high precision XYZ coordinates, a slit light reflection intensity determining circuit 7 for reducing the influence of the surface state of the object 6, a slit light projection intensity setting circuit 8 and a coordinate lookup table 9. Then a measurement system for the dimensions of a car bumper assembly, using a three-dimensional vision sensor and a dimension measurement algorithm, comprises: a three-dimensional vision sensor; a robot and a robot controller for setting the position of the three-dimensional vision sensor; and the characteristic points detecting unit 10 and the dimension calculating unit 11 which perform dimension processing on the XYZ coordinates obtained from the three-dimensional vision sensor. Namely, the characteristic points detecting unit 10 is constituted by the end point detecting circuit 12 which determines the end points of the slit line form the XYZ coordinates calculated by the coordinate calculating circuit 4' for each point on the slit line image. Further, the dimension calculating unit 11 consists of the subtraction circuit 13 which calculates the difference of the XYZ coordinates of the determined end points.

The system of the first embodiment for measuring three-dimensional shapes and dimensions, constituted as mentioned above, sets the three-dimensional vision sensor in the measurement position by means of the robot and projects slit light L towards the object 6 from the slit light source 1. Then in this position onto which the slit light L is projected, the XYZ coordinates (Y, Z) of the bumper as the object to be measured and the standard block are obtained by means of the coordinate calculating unit 4.

Namely, for each scanning line in the slit line image obtained by television camera imaging light projected onto the object, the coordinate calculating unit 4 calculates the position of the center of the slit light with good precision by finding the centroid of its reflection signal intensity, and determines the XYZ coordinates (Y, Z) by the principle of triangulation from the positions of the slit light source 1 and the television camera 2, and the obtained central position of the slit light. Moreover, in the first embodiment, the slit direction of the projected slit light and the scanning direction of the TV camera are spatially disposed in right angled directions.

Here, for example, when imaging by the television camera 2 having 500 scanning lines over the range of 30 mm in the Y direction, the pitch of the Y-direction data becomes about 0.06 mm, and 500 points of the XYZ coordinates (Y, Z) are obtained simultaneously on one slit line. Next, the characteristic points defining the dimensions are determined by the characteristic points detecting unit 10 from the XYZ coordinates obtained by the coordinate calculating unit 4. Namely, in the case of the first embodiment, the physical end forming the gap and flushness of the car bumper and standard block facing the object 6 is determined by finding the points (end points) at which the Z direction coordinate values abruptly change. Specifically, discrete values are obtained for the XYZ coordinates (Y, Z) from the above-mentioned coordinate calculating unit 4 according to the scanning lines of the television camera 2. However, at a portion where the slit light reflection signal cannot be obtained, the XYZ coordinates corresponding to the scanning lines cannot be determined. So, the Z coordinate of this portion is set as a special value showing that the Z coordinate is outside the range where measurement values can be obtained. This value is used as a flag showing that there is no reflection signal. For example;, fi a Z coordinate measurement value is obtained as a value of $-10$ mm to $+10$ mm, the flag value is set to a value (e.g. 1000) which is greatly different from a measurement value. Next, the difference in this Z coordinate is calculated corresponding to adjacent scanning lines in the Z coordinate, and a point where this difference has exceeded a threshold value can be determined as an end point. The threshold value, in order to eliminate a noise component, is decided according to the object shape, and for example, when a reflection signal is not present at the gap portion as in this first embodiment, the corresponding Z coordinate is a flag value as mentioned above, so that the difference value at the abovementioned gap end portion becomes essentially very large, and so the threshold value can be set comparatively large.

Further, in the case of the object of a concave shape with a bottom, when a reflection signal is present from the bottom corresponding to its gap portion, the difference value of each Z coordinate goes into the abovementioned measurement value range, but taking noise into account, by setting a comparatively small threshold value, the end point can be similarly determined. Next, the dimension calculating unit 11, by performing the subtraction of the Y coordinate values as in FIG. 5 in the XYZ coordinates of the end point corresponding to the determined physical end, calculates the gap, and calculates the flushness by performing the subtraction of the Z coordinate values ($Z_{ja} - Z_{jb}$). Then, the obtained dimension is compared with the previously set determination standard, and the quality of the assembly dimensions, namely the gap and flushness dimensions, are then decided by the determination unit 14.

Thus, in the first embodiment, the end points are extracted by comparison of the difference value and the threshold value at each position of the height information (Z coordinate) of the object based on the XYZ coordinates of the object obtained by means of slit light reflected from the object and imaged by the television camera. So, the system has advantages that the dimensions of flushness and gap of the object are obtained accurately with little calculation and so simple and rapid measurement is possible with high reliability.

The method employable at the characteristic points detecting unit 10 is not limited to that of the first embodiment. Other methods may include: a method using the coordinate values smoothed by means of a moving average and the like for at least one of the Z direction and the Y direction; a method taking as end points those points for which the difference of the difference in the Z direction is greater than a threshold value; a method taking as end points those points where the curvature or change of curvature becomes greater than a threshold value; and a method finding the centroid position of the difference in the Z direction or the difference of the difference in the Z direction as the end points. In the dimension calculating unit 11, not only the differences between the characteristic points are calculated, but the three-dimensional distance between 2 points may also be calculated in order to obtain gap dimension. In the system for measuring three-dimensional shapes and dimensions according to the first embodiment, these methods may be combined to achieve effects similar to those mentioned above.

EMBODIMENT 2

Figure 7:
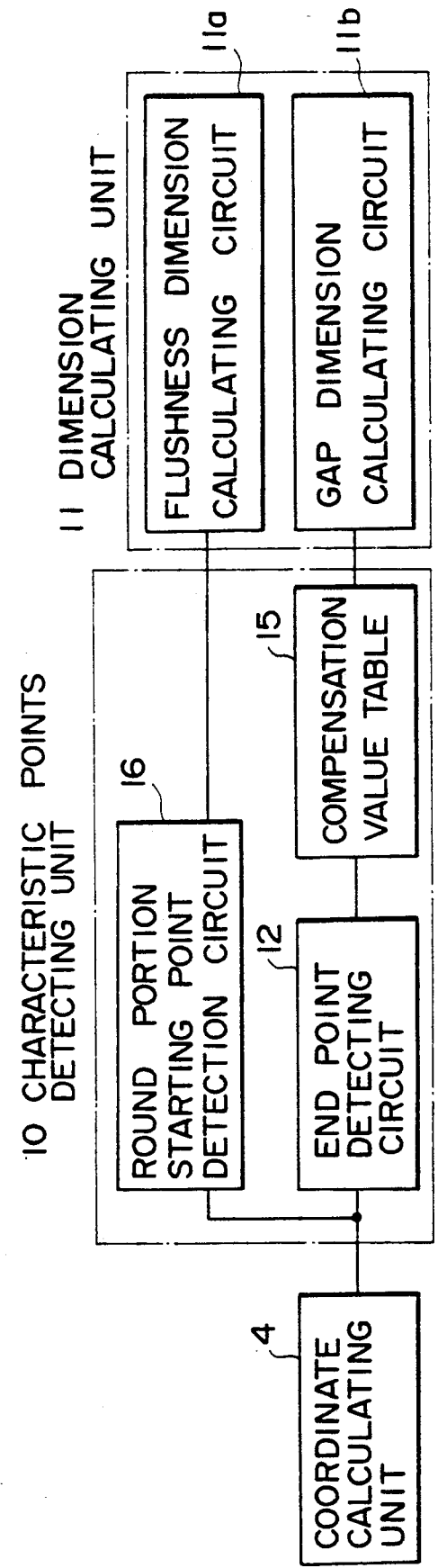
FIG. 7 and FIG. 8 are a block diagram and a flow chart of the system of the second embodiment.
Figure 8:
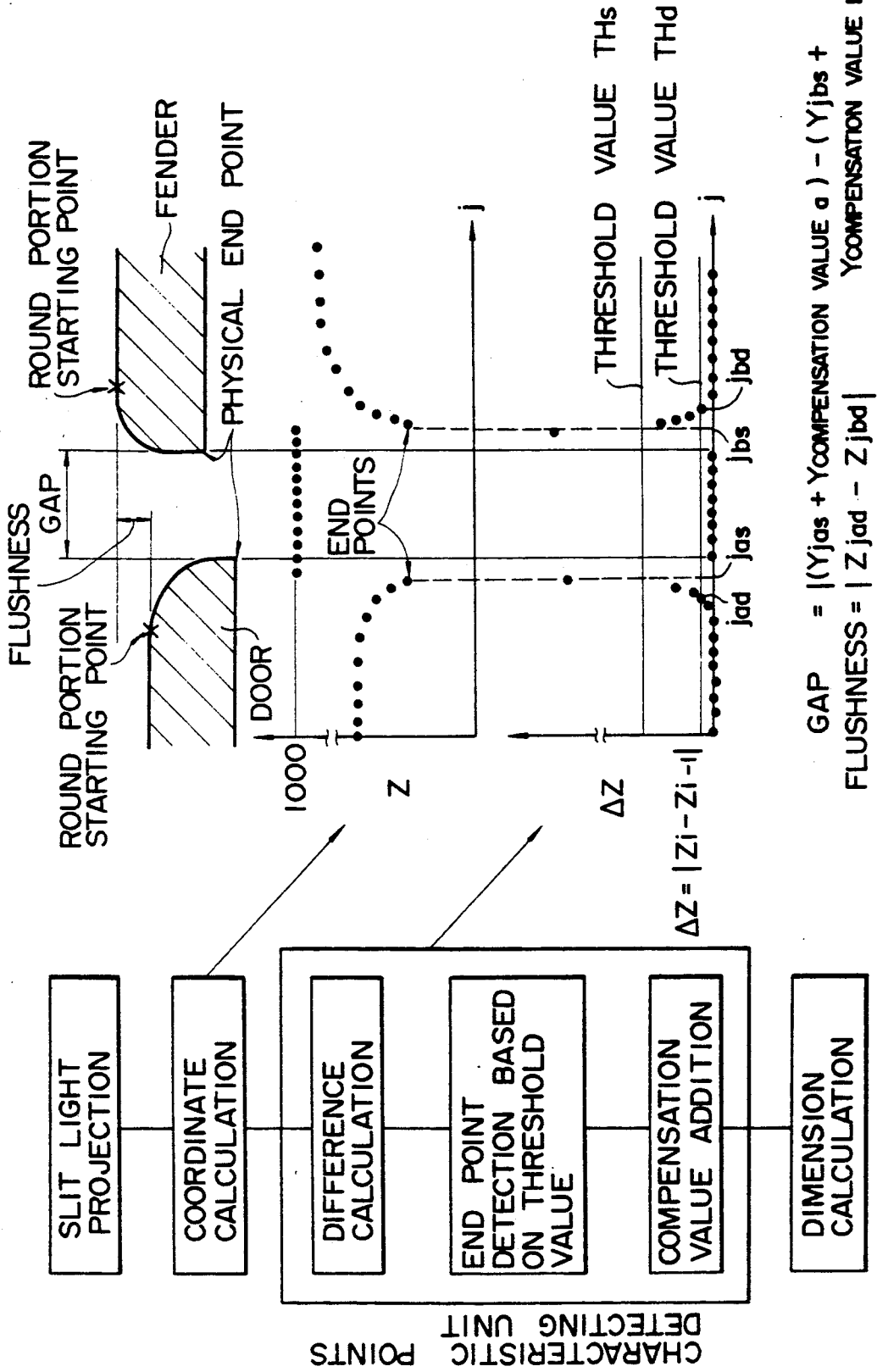
Figure 9:
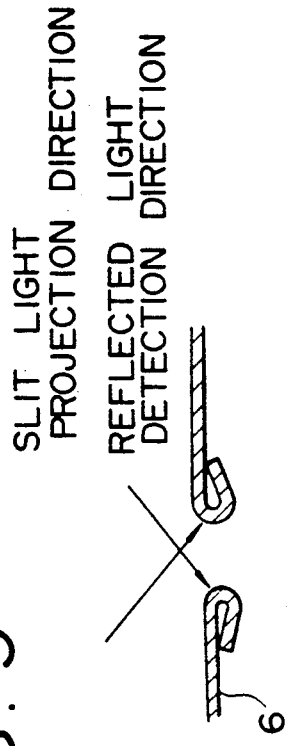
FIG. 9 is a diagram of the main part of the measurement object.
Figure 10:
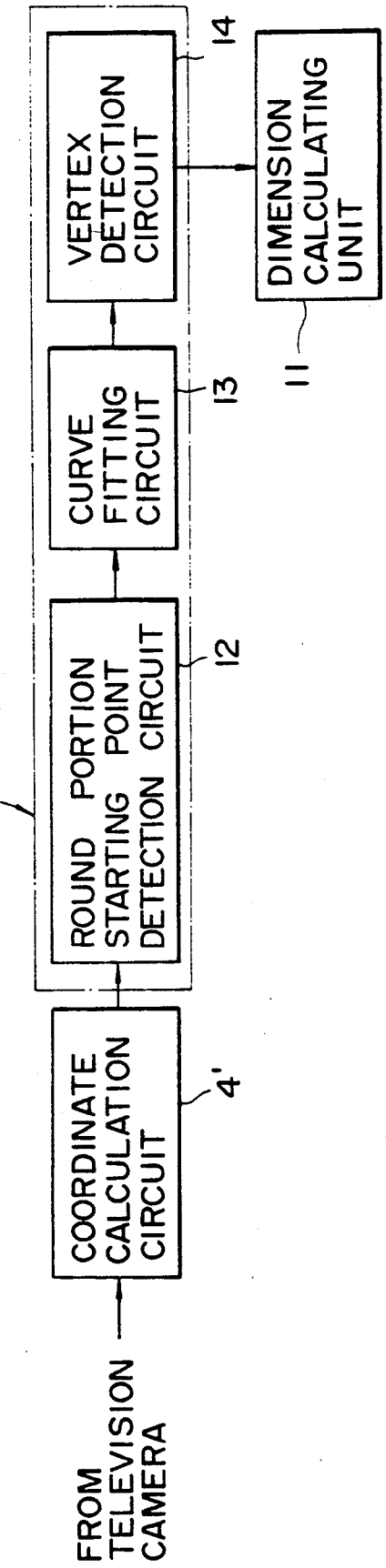
FIG. 10 is a block diagram showing specific parts in the system of the third embodiment.
Figure 11:
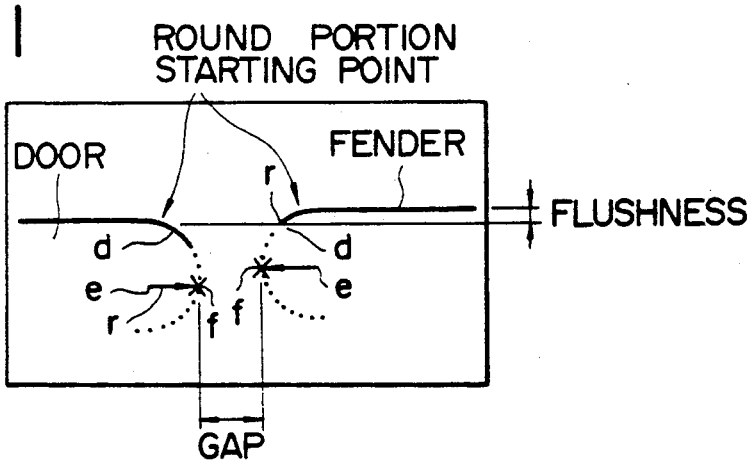
FIG. 11 is a line diagram of the slit line image in the system of the third embodiment.
Figure 12:
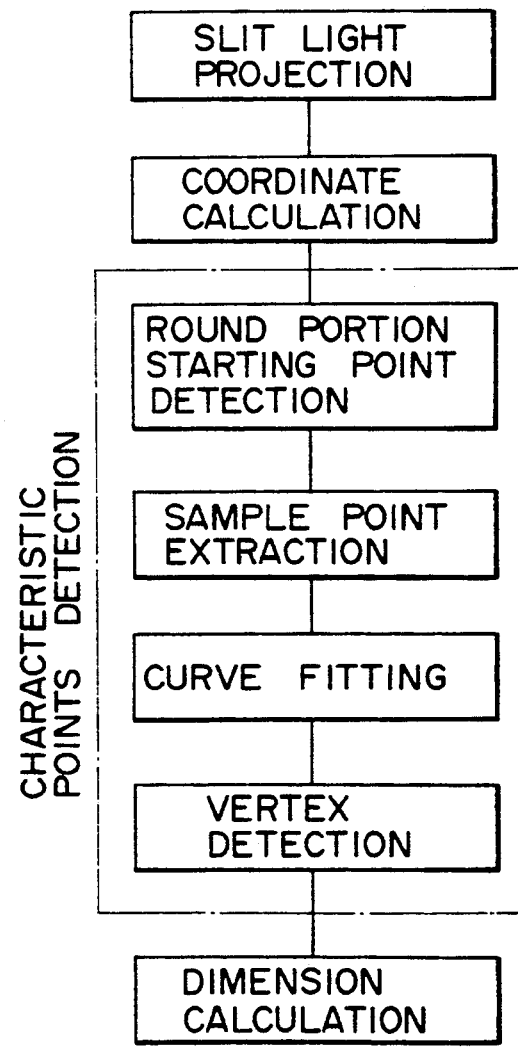
FIG. 12 is a diagram explaining the video signals output from the TV camera.

According to the second embodiment, the system for measuring three-dimensional shapes and dimensions is applied to a measuring system for the dimensions in body assembly, as shown in FIGS. 7 and 8. The system comprises a three-dimensional vision sensor, a characteristic points detecting unit 10 and a dimension calculating unit 11 which process dimensions for the XYZ coordinates obtained from the three-dimensional vision sensor similarly to that of the first embodiment. Namely, the characteristic points detecting unit 10 is constituted by an end point detecting circuit 12 which determines the end points of the slit line from the XYZ coordinates calculated by the coordinate calculating circuit 4' mentioned in the aforementioned first embodiment for each point on the slit line image, a compensation value table 15 and a round part detecting circuit 16, and the dimension calculating unit 11 is constituted by the flushness dimension calculating circuit 11a and the gap dimension calculating circuit 11b.

The compensation value table 15 is constituted as follows: the differences between the coordinate values of the end points of the slit line and the coordinate values of the vertices of the corner portions corresponding to open end portions of the object defining the gap, are measured by changing the conditions such as the shape of the corner portions of the object to be measured, the slit light reflection intensity, the position and posture of the imaging unit 3 relative to the object and the like; and the value of the differences is stored in memory as a compensation value with each condition as a parameter. Because the reflected signal of the projected slit light is hard to obtain by the television camera when the ends of the object have a curved shape, there are cases in which the XYZ coordinate values are not obtained up to the end portions. Even in such a case, this method enables to obtain the gap correctly.

In the system of the second embodiment for measuring three-dimensional shapes and dimensions, constituted as mentioned above, the three-dimensional vision sensor is set in the measurement position and slit light L from the slit light source 1 is projected toward the object 6. Fast and accurate coordinate calculation is performed by the coordinate calculating unit 4 as mentioned above in the first embodiment. Then, the characteristic point pair corresponding to the gap is determined by the method described below. Namely, the end point is determined by the end point detecting circuit 12, in a manner similar to the first embodiment, from the XYZ coordinates obtained by the coordinate calculating unit 4, and the point agreeing with the physical end is determined by adding to the XYZ coordinates of this point the compensation value previously stored in memory.

Namely, the point where $\Delta Z$ in FIG. 8 exceeds the threshold value THs corresponds to the $ja_s$ and $jb_s$ coordinate values, so giving the XYZ coordinates of the end point on the door side s $(Yja_s, Zja_s)$ and the XYZ coordinates at the end point on the fender side as $(Yjb_s, Zjb_s)$, and by adding a compensation value to each of the Y coordinates, the Y coordinates of the tip portions of the door and fender facing each other can be extrapolated.

The gap dimension can next be obtained by performing the subtraction $$(|Yja_s + Y \text{ compensation value a}| - |Yjb_s + Y \text{ compensation value b}|)$$

using the obtained Y coordinates of the tip portions of the door and fender in the gap dimension calculation circuit 11b. Further, the characteristic point pair corresponding to the flushness is determined by the method described below. Namely, similarly to the above-mentioned gap dimension measurement, from the XYZ coordinates obtained by the coordinate calculating unit 4, the round portion starting point detecting circuit 16 calculates the difference of the Z coordinate for each adjacent scanning line, and the point at which the difference exceeds a threshold value THd is determined as the round portion starting point. Here the threshold value THd differs from the threshold value THs in the gap dimension, and it is set at a value which is larger than the noise in the difference but sufficiently small to cut out the round portion. The flushness is next calculated by the flushness dimension calculating circuit 11a by means of the subtraction $(|Zjad - Zjbd|)$ of the Z coordinates of the detected round portion starting point. Moreover, the characteristic point pairs corresponding to the gap and flushness may be single or plural.

As mentioned above, even when a reflection signal is not obtained up to the end portion because the end portion of the object is of a curved shape, the second embodiment enables the correct measurement of gap and flushness, which is a great practical effect.

EMBODIMENT 3

According to the third embodiment, the system for measuring three-dimensional shapes and dimensions is applied to a dimensional measurement system for car body assembly. As in FIGS. 1, 6, and 9-12, the three-dimensional vision sensor comprises an imaging unit 3 having a slit light source 1 and television camera 2 an a coordinate calculating unit 4. The coordinate calculating unit 4 comprises a slit light center detection circuit 5 which performs the calculation of the centroid in order to obtain XYZ coordinates with high accuracy, a slit light reflection intensity detection circuit 7 to diminish the influence of the surface shape of the object 6, a slit light projection intensity setting circuit 8, and a coordinate lookup table 9. The system for the dimensional measurement in car body assembly using the three-dimensional vision sensor and the dimensional measurement algorithm comprises the three-dimensional vision sensor, the robot and robot controller for positioning the three-dimensional vision sensor, and the characteristic points detecting unit 10 and dimension calculating unit 11 which perform dimensional processing on the XYZ coordinates obtained from the three-dimensional vision sensor. The characteristic points detecting unit 10 is constituted by the round portion starting point detecting circuit 12, the curve fitting circuit 13 for determining the fitting curve of the round portion, and the vertex detecting circuit 14 for detecting the vertex of the curved portion.

The system of the third embodiment for measuring three-dimensional shapes and dimensions and constituted as mentioned above, positions the three-dimensional vision sensor in the measurement position by means of the robot and projects the slit light L towards the object 6 by means of the slit light source 1.

The coordinate calculating unit 4, at the slit line image obtained by imaging by the television camera after projecting light onto the object, determines for each scanning line the central position of the slit light with good precision by finding the centroid of these reflected signal intensities, and determines the XYZ coordinates (Y, Z) by means of the principle of triangulation from the obtained central position of the slit light, the position of the television camera and the slit light source. Moreover, in this embodiment, the slit direction of the projected slit light and the scanning line direction of the TV camera are disposed in spatially orthogonal directions.

Here, for example, in the case that a television camera of 500 scanning line images over a range of 30 mm in the Y direction, the data pitch in the Y direction becomes about 0.06 mm, and the XYZ coordinates (Y, Z) are obtained at 500 points.

The round portion starting point is determined by the characteristic points detecting unit 10, and the center and the radius of the circle are calculated from the XYZ coordinates of the sample points in the determined round portion, for example, by performing circular fitting by the least square method. The vertex is found by adding the radius which has been found to the Y coordinate of the round portion starting point. Otherwise, the radius of the circle may be added in the Y direction to the center coordinate of the fitted circle corresponding to the object shape and this may be regarded as the vertex. The vertices of each of the door part and the fender part are determined by performing a similar calculation for the door part and the fender part. The gap is calculated by the dimension calculating unit 11 by finding the distance of these vertices.

The difference between adjacent Z coordinates in these Z coordinates is next calculated, and the points at which these differences exceed a threshold value can be determined as characteristic points.

The threshold values are decided in accordance with the object shape in order to eliminate noise; for example, when no reflected light signal exists in the gap portion as in this third embodiment, because the Z coordinate corresponding to this is a flag value, as mentioned above, the difference value in the above-mentioned gap end portion substantially becomes very large, so that it can be set comparatively large.

Further, when the object is of a concave shape with a bottom, and when there is a reflected light signal from the bottom corresponding to the gap part, the difference value of each Z coordinate is set in the range of the afore-mentioned measurement values, but by setting a comparatively small threshold value taking noise into consideration, the characteristic points can be similarly determined.

In the XYZ coordinates at the determined characteristic points, the gap is next calculated by performing the subtraction in the Y direction, and the flushness is calculated by performing the subtraction of the Z direction, in the dimension calculating unit 11. The determination unit 14 then compares the obtained dimension with the previously set decision standard, and determines the quality of the assembly dimensions, namely the gap and flushness dimensions.

The third embodiment has the advantages that, based on the XYZ coordinates of the object obtained by means of slit light reflected from the object, it performs curve fitting at each position of the height information (Z coordinates) of the object, so that accurate measurements of the object's shape are obtained with little calculation, and simple, rapid and highly reliable measurements are possible.

The system of the third embodiment, in comparison with the conventional method of manually investigating the dimensions of a body assembly, performs a rapid and high precision automatic measurement and achieves efficiency in practical use.

Moreover similar operational advantages are obtained in curve fitting not only with circular fitting but also by using nth polynomial fitting and, in the vertex detection, by regarding the point of the change in the curve of the nth polynomial as the vertex.

EMBODIMENT 4

Figure 13:
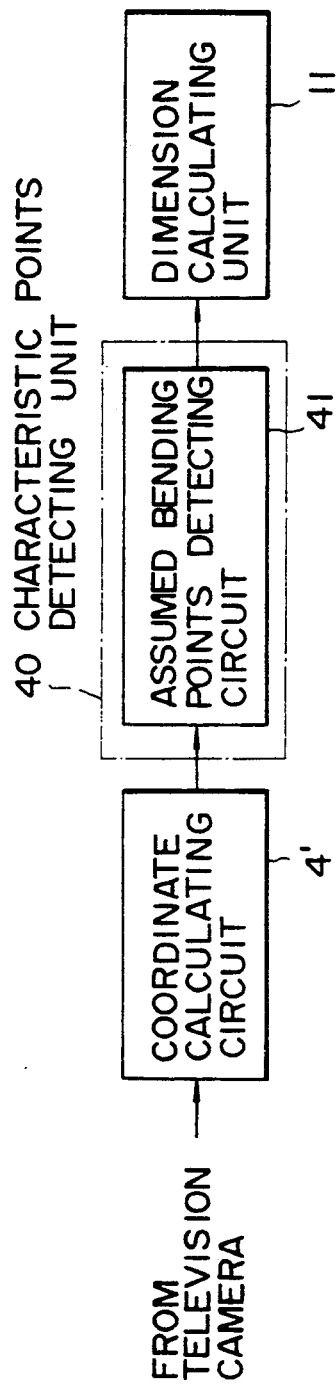
Figure 14:
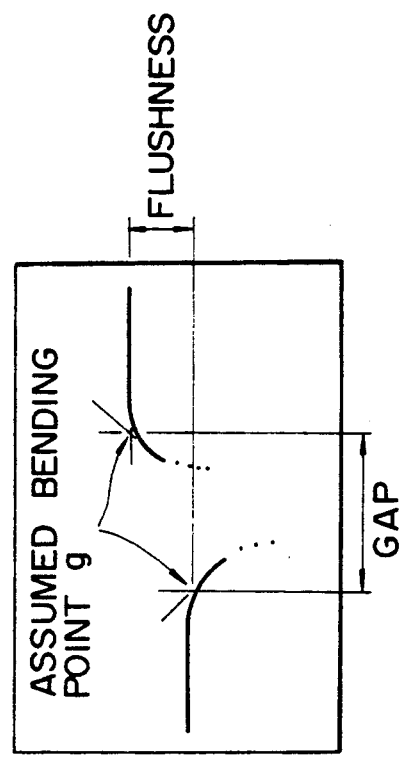

The system of the fourth embodiment, as shown in FIGS. 13–15, differs from each of the above embodiments in that the characteristic points detecting unit 40 is constituted by an assumed bending points detecting circuit 41. The assumed bending points detecting circuit 41 adopts the intersection points of several straight lines or curved lines as the characteristic points which decide the gap dimension constituting the distance between opposed points in the object; for example, when a corner of the object is formed by 2 straight lines and a circular arc lying between them, it detects the assumed bending points related to this.

The system of the fourth embodiment constituted as mentioned above, as shown in FIG. 15, after performing smoothing for the XYZ coordinates obtained by projecting the slit light from the slit light source 1 onto the measurement object, determines the intersection points of several straight lines or curved lines, namely the assumed bending points g. Thus, in the XYZ coordinates obtained by the coordinate calculating unit along the slit light, a region between points at which the difference of the difference of the adjacent Z coordinates exceeds a threshold value is defined by the assumed bending points detecting circuit as a region of bending. Before and after this region, 2 or more sample points are extracted, and polynomial fitting is performed from these sample points by the least square method to find the two straight lines between which the bending region is defined. The intersection point of these 2 straight lines is calculated, and this is made the assumed bending point. Then by calculating the distance between the mutually opposed assumed bending points g, the gap and flushness in the object can be measured.

Since the system of the fourth embodiment is equipped with the assumed bending points detecting circuit 41, it can measure gap and flushness dimensions for corner parts and the like with n sharp edges in the object to be measured with better precision and efficiency than in the third embodiment mentioned above.

EMBODIMENT 5

Figure 16:
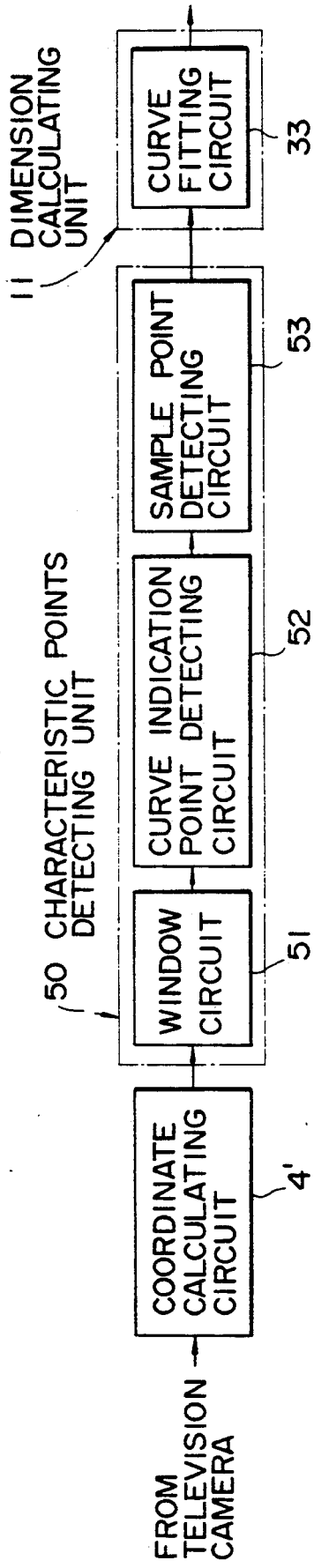
FIGS. 16-18 are respectively a block diagram, a line diagram and a flow chart showing the system of the fifth embodiment.
Figure 17:
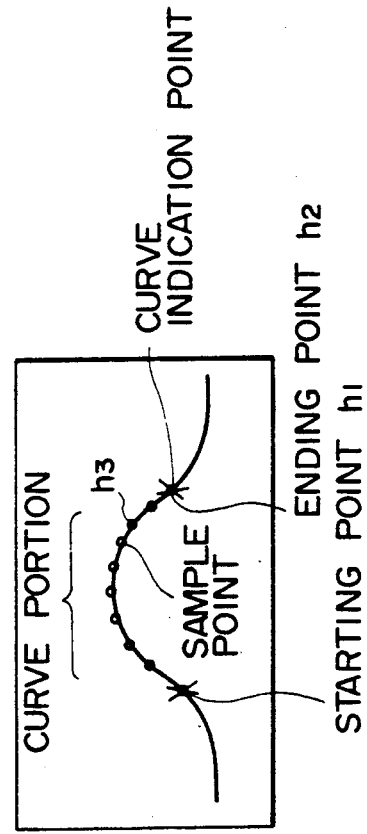
Figure 18:
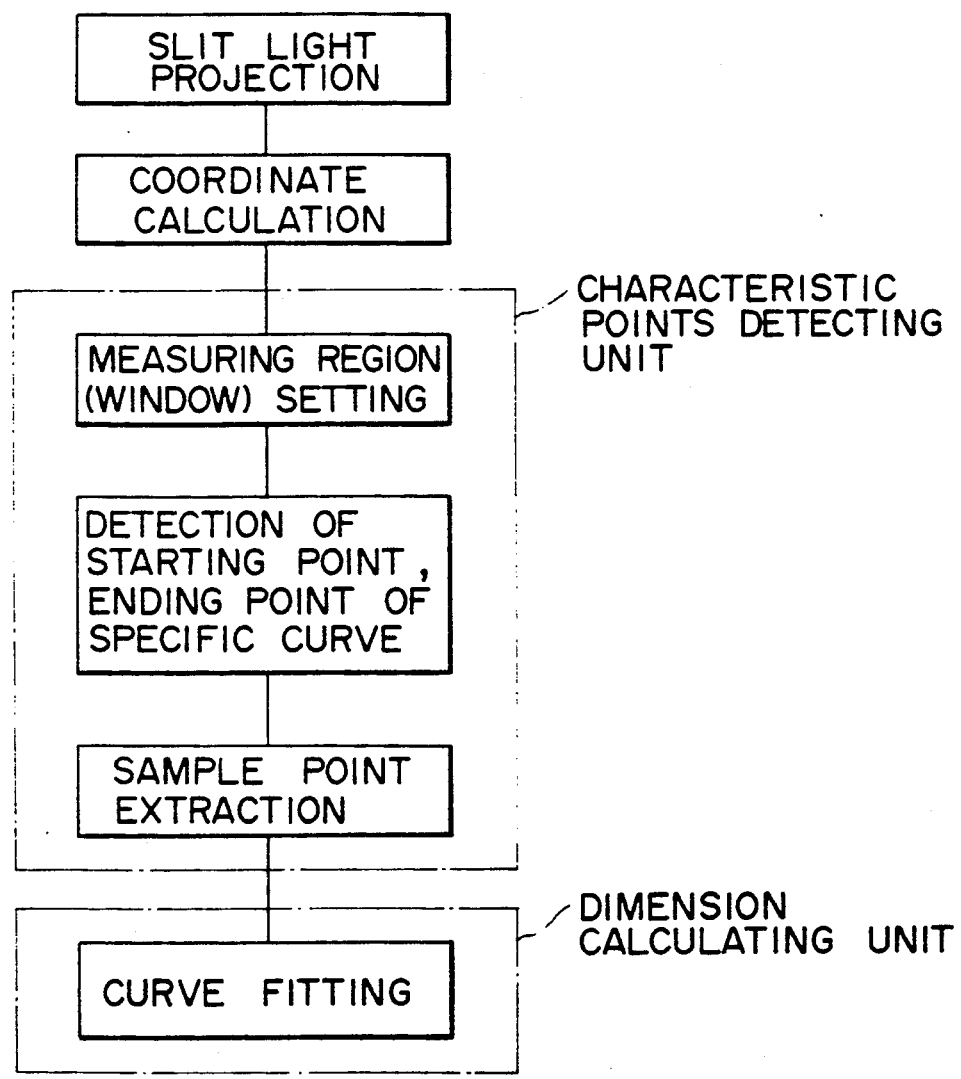

The system of the fifth embodiment, as shown in FIGS. 16–18, differs from each of the above embodiments in that it measures the curved shape of the object. The characteristic points detecting unit 50 comprises: the window circuit 51 which indicates the position of the outline of the curved portions to be measured; the curve indicating point detecting circuit 52 which detects the starting point $H_1$ and end point $h_2$ of the curve indicating points showing the curved portion to be measured in the window; and the sample points detecting circuit 53 which detects an optional number of sample points for curve fitting calculations on the curved portion lying between the curve indicating points. Here the curve indicating points detecting circuit 52 is constituted by circuits which detect inflection points and points where curvature changes according to kinds of the curves constituting the object. The dimension calculating unit 11 is constituted by curve fitting circuit 33 which performs polynomial fitting by the least square method for the sample points $H_3$ detected by the characteristic points detecting unit 50 and calculates the equation of the curve.

The system of the fifth embodiment, constituted as mentioned above, as shown in FIGS. 16–18, after performing smoothing on the XYZ coordinates obtained by projecting slit light from the slit light source onto the object to be measured, decides the points which are the same as the round portion starting points which function as the sample points $h_3$ between the starting point $h_1$ and the end point $h_2$ which function as curve indication points for the curved shape. It is possible to automatically measure the curved shape in the object by polynomial fitting of these sample points $h_3$ by the least square method to detect fitted curves and by calculation of mutually continuous multiple points.

EMBODIMENT 6

Figure 19:
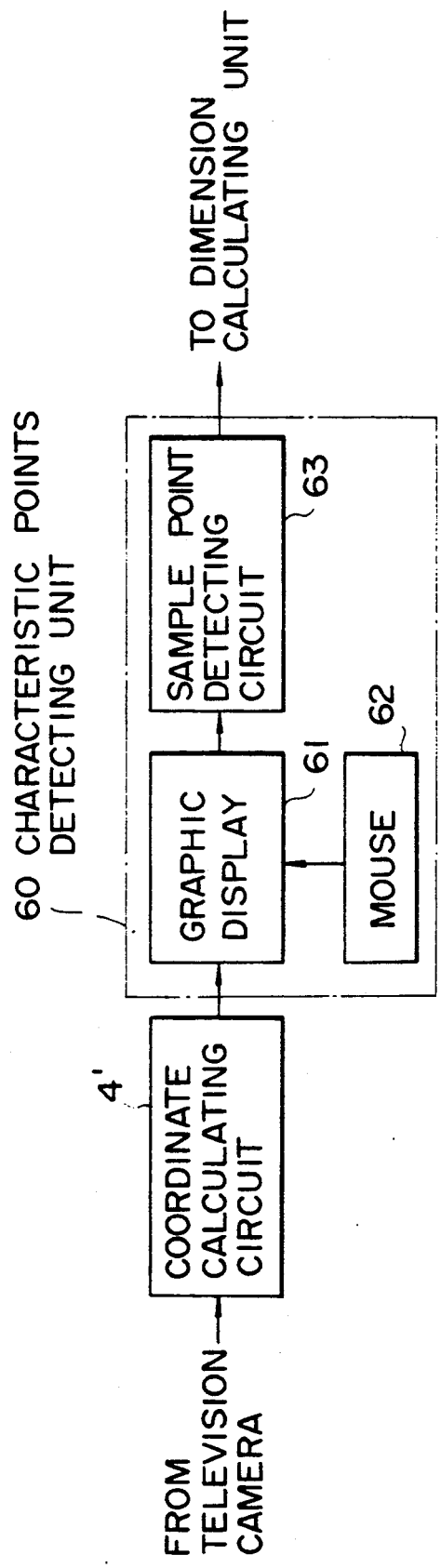
FIGS. 19 and 20 are respectively a block diagram and a line diagram showing the system of the sixth embodiment.
Figure 20:
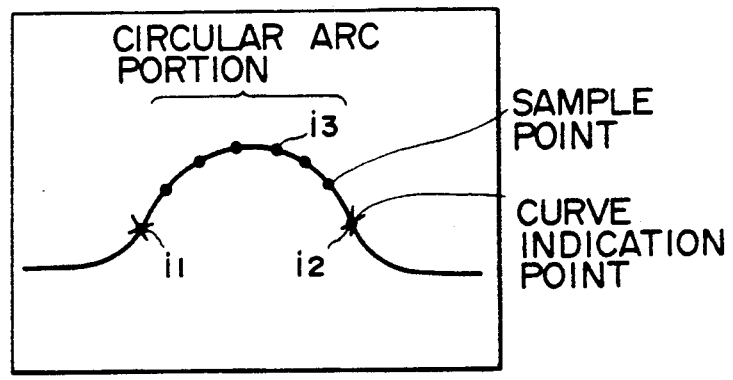

The system of the sixth embodiment, as shown in FIGS. 19 and 20, also measures the curved shape of an object, but differs from the fifth embodiment in that the characteristic points detecting unit 60 comprises: the graphic display unit 61 which displays the coordinate values calculated by the coordinate calculating unit 4; the mouse 62 for indicating the curve indication points showing the curved portion to be measured; and the sample point detecting circuit 63 which detects an optional number of sample points in order to calculate fitting of curves on the curve portion lying between the curve indication points.

The system of the sixth embodiment, constituted as abovementioned, as in FIG. 20, after smoothing has been performed of the XYZ coordinates obtained by projecting the slit light from the slit light source 1 on the object to be measured, decides the inflection points and points of curvature change as sample points $i_3$ between a starting point $i_1$ and an end point $i_2$ which function as the curve indication points for the curved shape. It is possible to automatically measure the curved shape in the object by polynomial fitting of this sample point $i_3$ by the least square method to detect fitted curves and by calculation of mutually continuous multiple points. This is more useful than the fifth embodiment when the shape of the object is complicated and when automatic measurement of the curved portion is difficult and a manual operation is performed.

MODIFICATION 1

Figure 21:
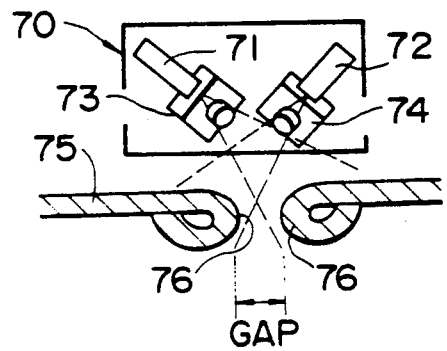
FIGS. 21 and 22 are respectively diagrams showing first and second modifications of the present invention.

In each of the above embodiments, as shown in FIG. 21, the imaging unit 70 may comprise a pair of slit light sources 71, 72 and television cameras 73, 74 positioned in such a ay as to project slit light form an oblique direction and to detect the reflected light at an oblique angle with respect to the respective opposed corner parts of the object forming the gap and flushness. In the first modification constituted as mentioned above, when the corner parts 76 of the object 75 are rounded, the coordinates of the rounded parts can be measured at multiple points by projecting slit light onto the respective rounded parts and measuring the slit lines, so that measurement data are obtained up to the physical end and the end point is determined with good precision.

As a result, measurement of the gap and flushness are achieved in practice with high precision and good efficiency. For example, even when detection up to the physical end is not possible, because the sample points increase when curve fitting is performed, whereby the precision of fitting the curve can be increased, thus enabling the measurement of the gap and the like with high precision.

MODIFICATION 2

Figure 22:
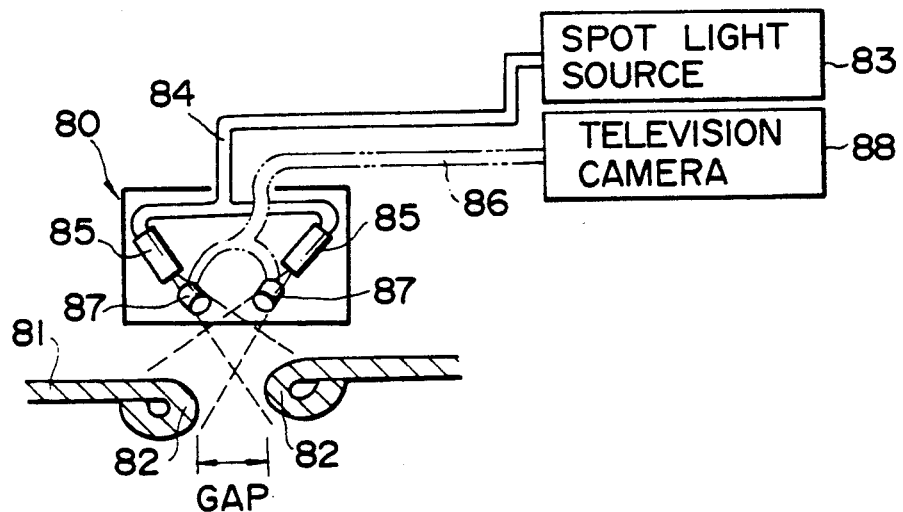

Moreover, as shown in FIG. 22, the imaging unit 80 may comprise a spot light source 83, an optical fiber 84 for branching, guiding and flashing the light from the spot light source 83, a lit light conversion lens 85 for converting the light form the optical fiber into slit light and projecting it onto the object, a condensing lens 87 which condenses the reflected light in the light-receiving optical fiber 86, and a television camera 88 which is connected to the light-receiving optical fiber 86, so as to project slit light form an oblique direction and detect reflected light form an oblique direction with respect to the respective opposed corner parts 82 of the object 81 forming the gap and flushness.

In the second modification constituted as mentioned above, the imaging unit 80 can be made smaller and lighter than in the first modification, and because it can simultaneously measure, with one television camera 88, the slit lines of the corner parts 82 of the object 81 which face each other, processing is performed at a higher speed and at a lower cost.

We claim:

1. A system for measuring three-dimensional shapes and dimensions comprising:

an imaging unit facing an object possessing at least two end portions forming at least one of a gap and flushness, and imaging by a TV camera a slit line formed on the object surface by a slit light projected from a slit light source onto the object surface at a fixed angle;

a surface feature extraction means comprising a slit light center detecting circuit which performs a centroid calculation of an intensity distribution of the slit line image to detect a slit light center position, said slit line image corresponding to scanning lines form said TV camera, a coordinate lookup table in which the relationship between the position of an image and XYZ coordinate values is previously calculated on the basis of triangulation and stored, said coordinate lookup table having a coordinate calculating unit which outputs XYZ coordinate values corresponding to the detected slit light center position on the object surface, said XYZ coordinate values being detected by triangulation based on the centroid position of the intensity distribution of each scanning line in the slit line image, and a characteristic points detecting unit which extracts at least one pair of characteristic points representing a shape change of the object surface by performing calculation based on differences between the XYZ coordinate values obtained for scanning lines at a given interval of the object surface, and by comparing the calculated results with standard values, and which detects the XYZ coordinates of said at least one pair of characteristic points; and a dimension calculating unit to calculate a relative position relationship between two characteristic points based on differences between XYZ coordinate values of said at least one pair of characteristic points detected by said characteristic points detecting unit, thereby measuring at least one of the gap and flushness between two end portions in a specific region of the object.

2. The system for measuring three-dimensional shapes and dimensions according to claim 1, wherein said characteristic points detecting unit possesses a first standard value for extracting as an end point which functions as the characteristic point, a point at which the XYZ coordinates rapidly change, and/or a second standard value for extracting as a rounded portion starting point which functions as the characteristic point, a point at which the XYZ coordinates change comparatively slowly.

3. The system for measuring three-dimensional shapes and dimensions according to claim 2, wherein said characteristic points detecting unit comprises a curve fitting circuit for fitting a curve function for a rounded portion by means of XYZ coordinate values of sample points in the rounded portion of the object surface detected based on said extracted the rounded portion starting point.

4. The system for measuring three-dimensional shapes and dimensions according to claim 1, further comprising a determination unit to determine quality by comparison of the dimension value calculated by said dimension calculating unit with previously set determination standards, depending on whether or not said dimension value is within the standards.

5. The system for measuring three-dimensional shapes and dimensions according to claim 1, wherein said characteristic points detecting unit has an assumed bending point detecting means which uses a region lying between points at which a difference of a difference in the XYZ coordinates obtained for each of said scanning lines exceeds a threshold value as a bending region, performs a function fitting with straight lines or curves by means of at least two sample points respectively extracted in a region which is not included in said bending region, and determines an intersection point of said fitted straight lines or curves i said bending region.

6. A system for measuring three-dimensional shapes and dimensions comprising:
an imaging unit facing an object with shape changes at least in height along the Z-axis, and imaging by a TV camera a slit line formed on the object surface by a slit light projected form a slit light source onto the object surface at a fixed angle; and
a surface feature extraction means comprising
a slit light center detecting circuit which performs a centroid calculation of an intensity distribution of the slit line image to detect a slit light center position, said slit line image corresponding to scanning lines from said TV camera,
a coordinate lookup table in which the relationship between the position of an image and XYZ coordinate values is previously calculated on the basis of triangulation and stored, said coordinate lookup table having a coordinate calculating unit which outputs XYZ coordinate values corresponding to the detected slit light center position on the object surface, said XYZ coordinate values being detected by triangulation based on the centroid position of the intensity distribution of each scanning line in the slit line image, and
a surface shape fitting unit for fitting a function corresponding to the change of the detected XYZ coordinate values of the object to the shape changes in a specific region of the object,
thereby measuring the surface shape in the specific region of the object by representing the same with a fitted function.

7. The system for measuring three-dimensional shapes and dimensions according to claim 6, wherein said surface shape fitting unit decides said specific region using a curvature change point or an inflection point in the change of XYZ coordinate value as boundary points.

8. The system for measuring three-dimensional shapes and dimensions according to claim 6, wherein said imaging unit is disposed so as to project slit light from an oblique direction and detect reflected light from an oblique direction respectively so as to observe the slit line of facing corner portions of the object forming the gap and flushness.

9. The system for measuring three-dimensional shapes and dimensions according to claim 6, wherein
said surface feature extraction means comprises: a starting point determination unit for determining a starting point of the shape change based on differences between the XYZ coordinate values along the Z-axis, said XYZ coordinate values corresponding to the scanning lines on the object surface; a surface shape fitting unit for fitting a function corresponding to the change of the detected XYZ coordinate values of the object surface to the surface change i the region specified by said starting point; and a characteristic points extracting unit for extracting a shape change portion of the object in the specific region as at least one characteristic point based on the fitting function,
further comprising a dimension calculating unit for calculating at least one of a gap and flushness of the object, by calculating a relative position relationship between said extracted characteristic points.

10. The system for measuring three-dimensional shapes and dimensions according to claim 9, further comprising a determination unit for determining the quality of the dimension value calculated by said dimension calculating unit by comparison with previously set determination standards, depending on whether or not said dimension value is within the standards.

11. The system for measuring three-dimensional shapes and dimensions according to claim 9, wherein said imaging unit is disposed so as to project slit light from an oblique direction and detect reflected light from an oblique direction respectively so as to observe the slit line of facing corner portions of the object forming the gap and flushness.

* * * * *

UNITED STATES PATENT AND TRADEMARK OFFICE
CERTIFICATE OF CORRECTION

PATENT NO. : 5,129,010

DATED : July 7, 1992

INVENTOR(S) : KAZUNORI HIGUCHI ET AL

It is certified that error appears in the above-identified patent and that said Letters Patent is hereby corrected as shown below:

Title page, item
    [73], Assignee: change "Toyoto" to --Toyota--.

Column 16, line 12, change "form" to --from--.

Column 17, line 10, change "i" to --in--;

line 16, change "form" to --from--.

Column 18, line 21, change "i" to --in--.

Signed and Sealed this

Fourteenth Day of September, 1993

*Attest:*

BRUCE LEHMAN

*Attesting Officer*       *Commissioner of Patents and Trademarks*